United States Patent
Pydah et al.

(10) Patent No.: US 10,084,307 B2
(45) Date of Patent: Sep. 25, 2018

(54) OVER-CURRENT PROTECTION IN MULTIPHASE DC-DC SWITCHING REGULATORS

(71) Applicant: TEXAS INSTRUMENTS INCORPORATED, Dallas, TX (US)

(72) Inventors: Pradeep V S R Pydah, Bangalore (IN); Biranchinath Sahu, Sunnyvale, CA (US); Tetsuo Tateishi, Aichi-Ken (JP); Kuang-Yao Cheng, East Greenwich, RI (US); Nandakishore Raimar, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 372 days.

(21) Appl. No.: 15/141,365

(22) Filed: Apr. 28, 2016

(65) Prior Publication Data

US 2017/0317488 A1 Nov. 2, 2017

(51) Int. Cl.
*H02H 7/12* (2006.01)
*H02H 3/087* (2006.01)
*G06F 1/26* (2006.01)

(52) U.S. Cl.
CPC ............. *H02H 7/1213* (2013.01); *G06F 1/26* (2013.01); *H02H 3/087* (2013.01)

(58) Field of Classification Search
CPC ......... H02H 7/1213; H02H 8/087; G06F 1/26
See application file for complete search history.

(56) References Cited

U.S. PATENT DOCUMENTS 4,651,076 A * 3/1987 Oltendorf ................. H02P 8/14
                                                                                                        318/685
9,350,286 B2 * 5/2016 Satou ..................... H02P 29/032

* cited by examiner

*Primary Examiner* — Scott Bauer
(74) *Attorney, Agent, or Firm* — John R. Pessetto; Charles A. Brill; Frank D. Cimino

(57) ABSTRACT

The disclosure provides an over-current protection circuit. A signal generating block in the over-current protection circuit generates one or more input voltages, a summed voltage and an average voltage in response to one or more differential voltages. A control block generates one or more control signals in response to the one or more input voltages and the average voltage. An analog control loop block generates an initiation signal in response to the summed voltage and an output voltage. A phase control logic block generates one or more PWM (pulse width modulated) signals in response to the initiation signal and the one or more control signals.

20 Claims, 3 Drawing Sheets

OVER-CURRENT PROTECTION IN MULTIPHASE DC-DC SWITCHING REGULATORS

TECHNICAL FIELD

The present disclosure is generally related to multi-phase DC-DC switching regulator, and more particularly to an over-current protection circuit for a multi-phase DC-DC switching regulator.

BACKGROUND

Multi-phase DC-DC switching regulators are generally used in high current applications for better thermal management while enabling use of power stage components (inductors, capacitors, switches) with lower ratings and cost. A multiphase DC-DC switching regulator operates in multiple phases. The multiphase DC-DC switching regulator is designed to provide equal current to a load in all the phases.

A typical multi-phase DC-DC switching regulator includes a pulse width modulating (PWM) Controller. A plurality of switches is coupled to the PWM controller, and each switch of the plurality of switches includes an inductor. A switch provides the current to the load in a given phase, and the current is provided through the inductor in the switch.

The inductors which carry current to the load suffer from potential failures due to process, aging and yield issues. In this condition, one or more inductors may fail, thereby transferring the load current to the remaining inductors which are functional. Even when the load is within a maximum current limit, the remaining inductors might carry currents beyond their rating because of the failure of the one or more inductors. This results in damaging the remaining inductors as well. In addition, the existing over-current protection circuits are complex.

SUMMARY

According to an aspect of the disclosure, an over-current protection circuit is disclosed. A signal generating block in the over-current protection circuit generates one or more input voltages, a summed voltage and an average voltage in response to one or more differential voltages. A control block generates one or more control signals in response to the one or more input voltages and the average voltage. An analog control loop block generates an initiation signal in response to the summed voltage and an output voltage. A phase control logic block generates one or more PWM (pulse width modulated) signals in response to the initiation signal and the one or more control signals.

BRIEF DESCRIPTION OF THE VIEWS OF DRAWINGS

DETAILED DESCRIPTION OF THE EMBODIMENTS

Figure 1:
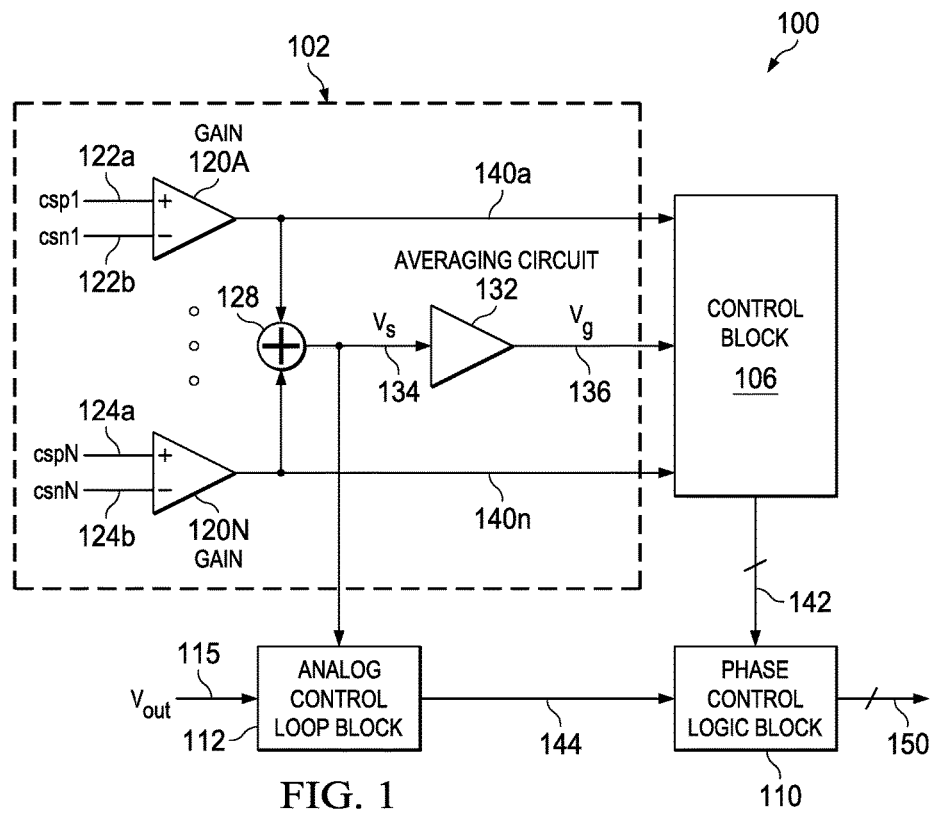
FIG. 1 illustrates an over-current protection circuit, according to an embodiment.

FIG. 1 illustrates an over-current protection circuit 100, according to an embodiment. The over-current protection circuit 100 includes a signal generating block 102, a control block 106, an analog control loop block 112 and a phase control logic block 110. The control block 106 and the analog control loop block 112 are coupled to the signal generating block 102. The phase control logic block 110 is coupled to the control block 106 and the analog control loop block 112. The signal generating block 102 includes one or more gain circuits illustrated as 120A to 120N. Each gain circuit of the one or more gain circuits receive a differential voltage. For example, the gain circuit 120A receives csp1 122a and csn1 122b as differential voltage. Similarly, the gain circuit 120N receives cspN 124a and csnN 124b as differential voltage.

A summer 128 is coupled to the one or more gain circuits 120A to 120N. An averaging circuit 132 is coupled to the summer 128. The control block 106 is coupled to the averaging circuit 132 and the one or more gain circuits 120A to 120N. The analog control loop block 112 is coupled to the summer 128. The over-current protection circuit 100 may include one or more additional components known to those skilled in the relevant art and are not discussed here for simplicity of the description.

The operation of the over-current protection circuit 100 illustrated in FIG. 1 is explained now. The signal generating block 102 generates one or more input voltages illustrated as 140a to 140n, a summed voltage Vs 134 and an average voltage Vg 136 in response to one or more differential voltages. The operation of the signal generating block 102 is explained now. The one or more gain circuits 120A to 120N generate one or more input voltages 140a to 140n in response to the one or more differential voltages. For example, the gain circuit 120A generates the input voltage 140a in response to the differential voltage csp1 122a and csn1 122b. Similarly, the gain circuit 120N generates the input voltage 140n in response to the differential voltage cspN 124a and csnN 124b.

The summer 128 in the signal generating block 102 sums the one or more input voltages 140a to 140n to generate the summed voltage Vs 134. The averaging circuit 132 is coupled to the summer 128. The averaging circuit 132 averages the summed voltage Vs 134 and generates the average voltage Vg 136.

The control block 106 receives the one or more input voltages 140a to 140n and the average voltage Vg 136. The control block 106 generates one or more control signals 142 in response to the one or more input voltages 140a to 140n and the average voltage Vg 136. The analog control loop block 112 generates an initiation signal 144 in response to the summed voltage Vs 134 and an output voltage Vout 115. The phase control logic block 110 generates one or more PWM (pulse width modulated) signals 150 in response to the initiation signal 144 and the one or more control signals 142.

The over-current protection circuit 100, in one example, is used in multi-phase DC-DC switching regulators includes a PWM controller. The PWM controller includes one or more inductors through which current is provided to a load. The output voltage Vout 115 is a voltage generated across the load. Each differential voltage of the one or more differential voltages is proportional to a current flowing through an inductor of the one or more inductors. A number of inductors is proportional to a number of phases in the PWM controller.

The control block 106 receives the one or more input voltages 140a to 140n and the average voltage Vg 136. The control block 106, in one example, threshold shifts the one or more input voltages 140a to 140n. When the average voltage Vg 136 is greater than at least one of the threshold shifted one or more input voltages, an over-current condition is detected. Thus, each control signal of the one or more control signals 142 represent if an over-current condition is detected for an inductor of the one or more inductors.

The phase control logic block 110 inactivates the PWM controller when the over-current condition is detected in any phase. Thus, the over-current protection circuit 100 prevents damaging of the PWM controller when the over-current condition is detected. The over-current protection circuit 100 latches-off the PWM controller when there is a mismatch in the current through one or more inductors. In addition, the over-current protection circuit 100 allows scalability of a number of phases with respect to the current provided to the load.

Figure 2:
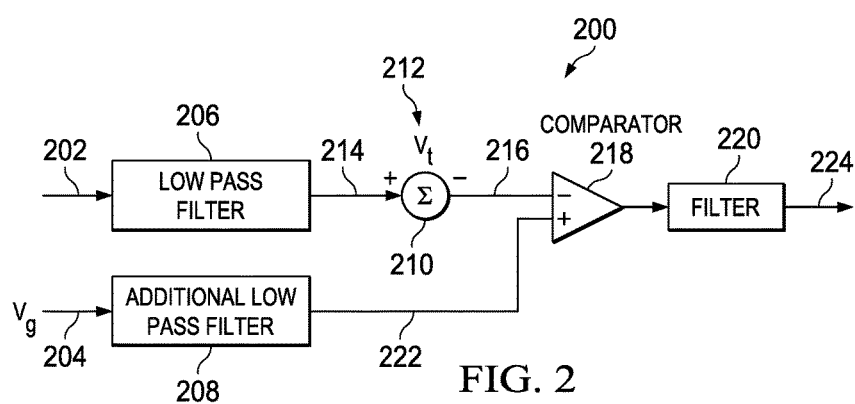
FIG. 2 illustrates a signal control path, according to an embodiment.

FIG. 2 illustrates a signal control path 200, according to an embodiment. The control block 106, illustrated in FIG. 1, includes one or more signal control paths. The signal control path 200 is one of the one or more signal control paths. The signal control path 200 includes a low pass filter 206, a threshold addition block 210, an additional low pass filter 208, a comparator 218 and a digital filter 220. The low pass filter 206 receives an input voltage 202. The input voltage 202 is one of the one or more input voltages 140a to 140n, illustrated in FIG. 1.

The additional low pass filter 208 receives an average voltage Vg 204. The average voltage Vg 204 is similar to the average voltage Vg 136 illustrated in FIG. 1. The threshold addition block 210 is coupled to the low pass filter 206, and receives a voltage threshold Vt 212. The comparator 218 is coupled to the threshold addition block 210 and the additional low pass filter 208. The digital filter 220 is coupled to the comparator 218. The signal control path 200 may include one or more additional components known to those skilled in the relevant art and are not discussed here for simplicity of the description.

The operation of the signal control path 200 illustrated in FIG. 2 is explained now. The low pass filter 206 filters the input voltage 202 to generate a filtered voltage 214. The threshold addition block 210 adds the voltage threshold Vt 212 to the filtered voltage 214 to generate a shifted voltage 216. The additional low pass filter 208 filters the average voltage Vg 204 to generate an average filtered voltage 222. The comparator 218 compares the shifted voltage 216 and the average filtered voltage 222 to generate a detected signal. The digital filter 220 filters the detected signal to generate a control signal. The control signal is one of the one or more control signals 142 illustrated in FIG. 1.

Each signal path of the one or more signal paths in the control block 106 is associated with a corresponding gain circuit. A number of signal paths is proportional to a number of phases in a PWM controller of which the control block 106 is a part. The voltage threshold Vt 212 can be configured differently for other signal control paths. In one example, the voltage threshold Vt 212 is adjusted based on the DC resistance associated with an inductor in the PWM controller.

When the average filtered voltage 222 is greater than the shifted voltage 216, an over-current condition is detected. Thus, each control signal of the one or more control signals 142 represent if an over-current condition is detected for an inductor of the one or more inductors in the PWM controller.

Figure 3:
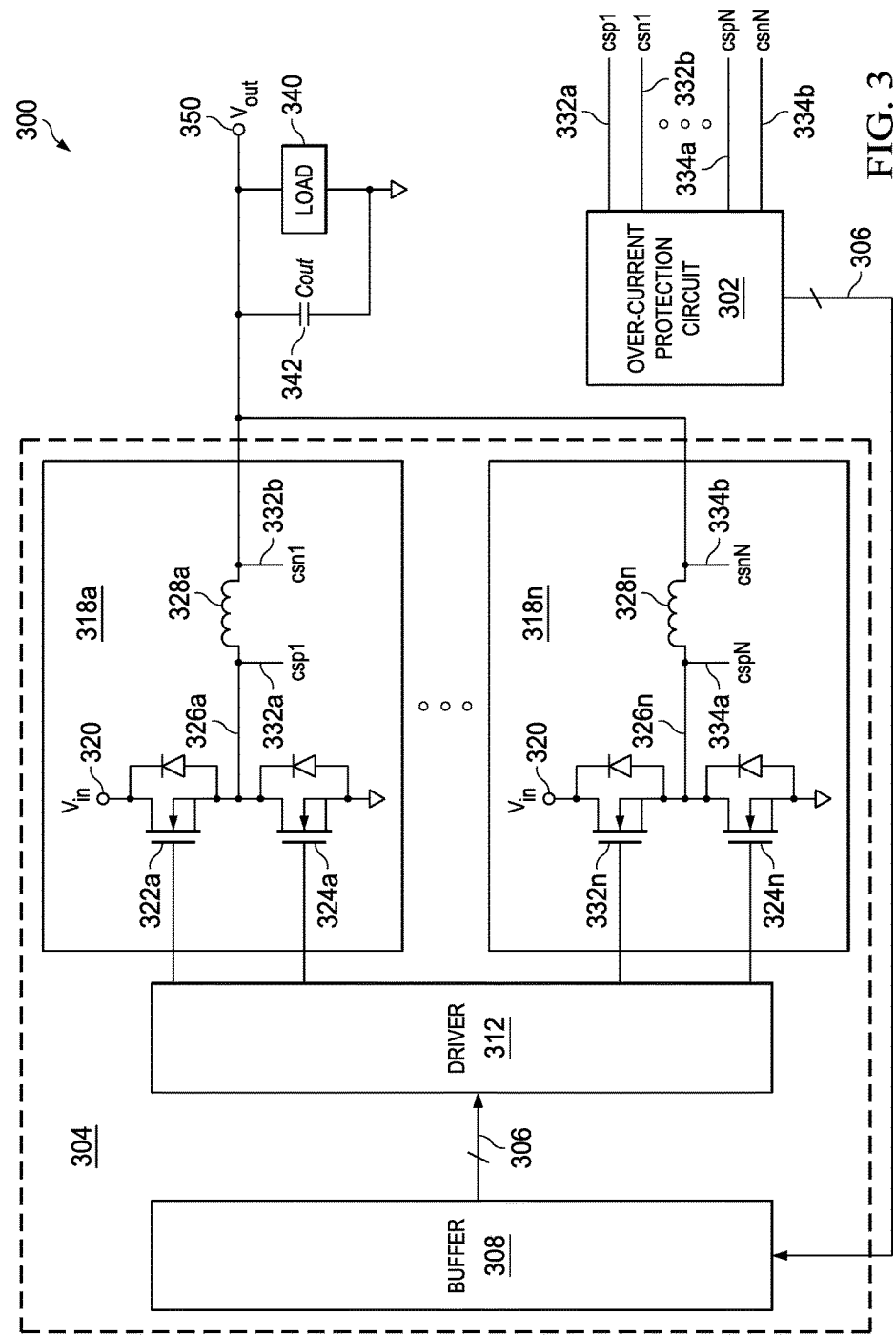
FIG. 3 illustrates a schematic of a switching regulator, according to an embodiment.

FIG. 3 illustrates a schematic of a switching regulator 300, according to an embodiment. The switching regulator 300 includes an over-current protection circuit 302, a PWM (pulse width modulating) controller 304 and a load 340. The over-current protection circuit 302 is analogous to the over-current protection circuit 100 in connection and operation. The PWM controller 304 includes a buffer 308, a driver 312 and one or more switches represented as 318a to 318n. The buffer 308 is coupled to the over-current protection circuit 302, and the driver 312 is coupled to the buffer 308. The one or more switches 318a to 318n are coupled to the driver 312.

Each switch of the one or more switches 318a to 318n includes a first transistor, a second transistor and an inductor. For example, the switch 318a includes the first transistor 322a, the second transistor 324a and the inductor 328a. The first transistor 322a receives an input supply Vin 320. The second transistor 324a is coupled to the first transistor 322a at a common node 326a. A gate terminal of each of the first transistor 322a and the second transistor 324a are coupled to the driver 312. The inductor 328a is coupled between the common node 326a and the load 340.

Similarly, the switch 318n includes a first transistor 322n, a second transistor 324n and an inductor 328n. The first transistor 322n receives the input supply Vin 320. The second transistor 324n is coupled to the first transistor 322n at a common node 326n. A gate terminal of each of the first transistor 322n and the second transistor 324n are coupled to the driver 312. The inductor 328n is coupled between the common node 326n and the load 340.

The load 340 is coupled to the one or more switches 318a to 318n. A load capacitor Cout 342 is coupled in parallel to the load 340. An output voltage Vout 350 is generated across the load 340. The switching regulator 300 may include one or more additional components known to those skilled in the relevant art and are not discussed here for simplicity of the description.

The operation of the switching regulator 300 illustrated in FIG. 3 is explained now. The over-current protection circuit 302 receives one or more differential voltages represented as csp1 332a, csn1 332b, cspN 334a and csnN 334b. The differential voltage csp1 332a and csn1 332b is generated across the inductor 328a in the switch 318a. Similarly, the differential voltage cspN 334a and csnN 334b are generated across the inductor 328n in the switch 318n.

The over-current protection circuit 302 generates one or more PWM signals 306 in response to the one or more differential voltages. The operation of the over-current protection circuit 302 is similar to the over-current protection circuit 100 illustrated in FIG. 1. The buffer 308 receives the one or more PWM signals 306 from the over-current protection circuit 302, and stores the one or more PWM signals 306. The buffer 308 generates the one or more PWM signals 306. In one version, the over-current protection circuit 302 is part of the buffer 308. In another version, the buffer 308 temporarily stores the one or more PWM signals 306. In yet another version, the buffer 308 is not present in the switching regulator 300, and the one or more PWM signals 306 generated by the over-current protection circuit 302 is provided directly to the driver 312. The PWM controller 304 drives the load 340 based on the one or more PWM signals 306. A number of PWM signals provides a number of phases in the PWM controller 304.

The driver 312 generates one or more driving signals in response to the one or more PWM signals 306 received from the buffer 308. The one or more switches 318a to 318n receives the one or more driving signals from the driver 312. A gate terminal of each of the first transistor and the second transistor in a switch receives the driving signals from the driver 312. For example, the gate terminal of the first transistor 322a and the second transistor 324a receives the driving signals from the driver 312.

The driver 312 activates a switch of the one or more switches 318a to 318n in a defined phase of the number of phases in the PWM controller 304. In one version, the number of phases in the PWM controller 304 is proportional to a number of switches in the PWM controller 304. When a switch is activated by the driver 312, the switch provides a current to the load in response to the driving signal of the one or more driving signals. In an example, when the PWM controller 304 includes 4 switches, a first switch is activated during phase of 0-90 degree, a second switch is activated during phase of 90-180 degree, a third switch is activated during phase of 180-270 degree, and a fourth switch is activated during phase of 270-360 degree.

A switch provides the current to the load 340 in a given phase, and the current is provided through the inductor in the switch. For example, during a first phase of 0 degrees to 90 degree, the switch 318a provides current to the load 340, and the current is provided through the inductor 328a in the switch 318a. The differential voltage csp1 332a and csn1 332b developed across the inductor 328a is provided to the over-current protection circuit 302. In one version, under certain heavy load conditions, the activation of switches can overlap.

The over-current protection circuit 302 detects when a current flowing through an inductor in a switch is above a threshold. When the over-current condition is detected, the PWM controller 304 is inactivated by the over-current protection circuit 302. The over-current protection circuit 302 latches-off the PWM controller 304 when there is a mismatch in a current through one or more inductors. Thus, when an over-current is detected, the one or more switches 318a to 318n are inactivated, resulting in shutting down of the switching regulator 300. In one example, the one or more switches 318a to 318n are inactivated when the over-current is detected for a duration more than a deglitch time of the digital filter 220.

Figure 4:
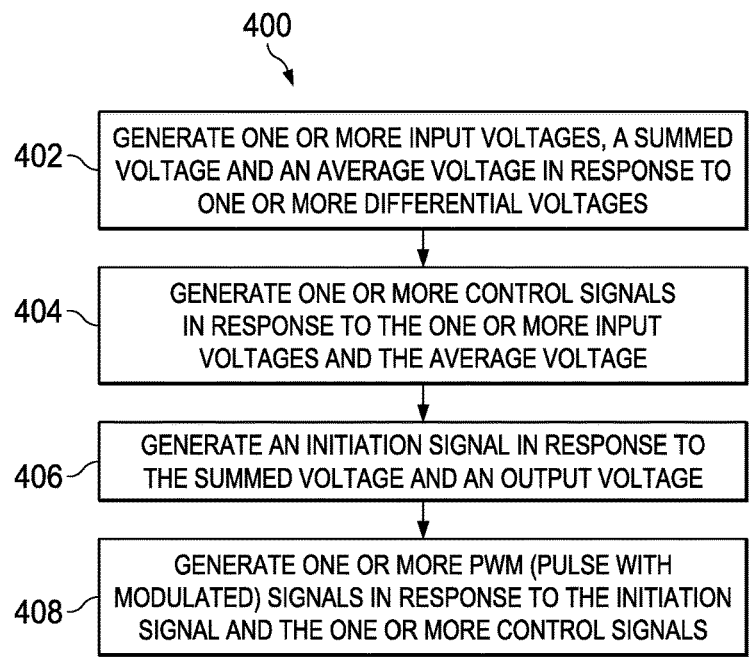
FIG. 4 is a flowchart illustrating a method according to an embodiment.

FIG. 4 is a flowchart 400 illustrating a method according to an embodiment. At step 402, one or more input voltages, a summed voltage and an average voltage is generated in response to one or more differential voltages. For example, in the over-current protection circuit 100, the signal generating block 102 generates one or more input voltages illustrated as 140a to 140n, a summed voltage Vs 134 and an average voltage Vg 136 in response to one or more differential voltages. The one or more input voltages are summed to generate the summed voltage. In one example, the average voltage is generated from the summed voltage.

At step 404, one or more control signals are generated in response to the one or more input voltages and the average voltage. In one example, the one or more inputs voltages are threshold shifted. When the average voltage is greater than at least one of the threshold shifted one or more input voltages, an over-current condition is detected. Thus, each control signal of the one or more control signals represent if an over-current condition is detected.

An initiation signal is generated in response to the summed voltage and an output voltage, at step 406. At step 408, one or more PWM (pulse width modulated) signals are generated in response to the initiation signal and the one or more control signals. A PWM controller includes one or more inductors through which current is provided to a load. Each differential voltage of the one or more differential voltages is proportional to a current flowing through an inductor of the one or more inductors.

The one or more PWM signals are provided to the PWM controller. The PWM controller drives the load based on the one or more PWM signals. A number of PWM signals provide a number of phases in the PWM controller. A voltage generated across a load is the output voltage. The PWM controller is latched when there is a mismatch in the current through one or more inductors.

Figure 5:
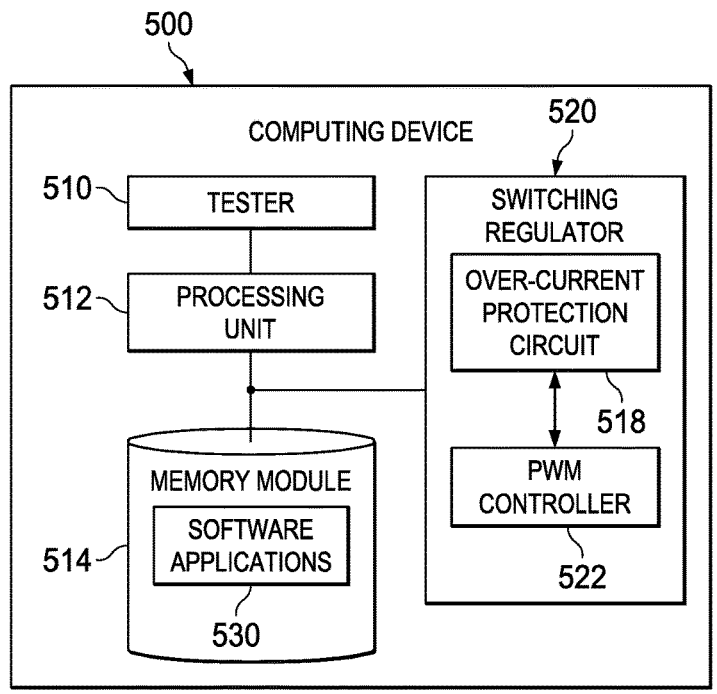
FIG. 5 illustrates a computing device, according to an embodiment.

FIG. 5 illustrates a computing device 500, according to an embodiment. The computing device 500 is, or is incorporated into, a mobile communication device, such as a mobile phone, a personal digital assistant, a transceiver, a personal computer, or any other type of electronic system. The computing device 500 may include one or more additional components known to those skilled in the relevant art and are not discussed here for simplicity of the description.

In some embodiments, the computing device 500 comprises a megacell or a system-on-chip (SoC) which includes a processing unit 512 such as a CPU (Central Processing Unit), a memory module 514 (e.g., random access memory (RAM)) and a tester 510. The processing unit 512 can be, for example, a CISC-type (Complex Instruction Set Computer) CPU, RISC-type CPU (Reduced Instruction Set Computer), or a digital signal processor (DSP).

The memory module 514 (which can be memory such as RAM, flash memory, or disk storage) stores one or more software applications 530 (e.g., embedded applications) that, when executed by the processing unit 512, performs any suitable function associated with the computing device 500. The tester 510 comprises logic that supports testing and debugging of the computing device 500 executing the software applications 530.

For example, the tester 510 can be used to emulate a defective or unavailable component(s) of the computing device 500 to allow verification of how the component(s), were it actually present on the computing device 500, would perform in various situations (e.g., how the component(s) would interact with the software applications 530). In this way, the software applications 530 can be debugged in an environment which resembles post-production operation.

The processing unit 512 typically comprises memory and logic which store information frequently accessed from the memory module 514. The computing device 500 includes a switching regulator 520. The switching regulator 520 is coupled to the processing unit 512 and the memory module 514. The switching regulator 520 includes an over-current protection circuit 518. The over-current protection circuit 518 is similar in connection and operation to the over-current protection circuit 100. The over-current protection circuit 518 includes a signal generating block, a control block, an analog control loop block and a phase control logic block.

The switching regulator 520 includes a PWM controller 522. The PWM controller 522 includes one or more inductors through which current is provided to a load. A differential voltage across an inductor of the one or more inductors is proportional to a current flowing through the inductor. The differential voltage across each inductor of the one or more inductors is provided to the over-current protection circuit 518. The over-current protection circuit 518 latches-off the PWM controller 522 when there is a mismatch in the current through one or more inductors.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. An over-current protection circuit comprising:
   a signal generating block configured to generate one or more input voltages, a summed voltage and an average voltage in response to one or more differential voltages;
   a control block configured to generate one or more control signals in response to the one or more input voltages and the average voltage;
   an analog control loop block configured to generate an initiation signal in response to the summed voltage and an output voltage; and
   a phase control logic block configured to generate one or more PWM (pulse width modulated) signals in response to the initiation signal and the one or more control signals.

2. The over-current protection circuit of claim 1, wherein the signal generating block comprises:
   one or more gain circuits configured to generate the one or more input voltages in response to the one or more differential voltages;
   a summer configured to sum the one or more input voltages to generate the summed voltage; and
   an averaging circuit coupled to the summer and configured to generate the average voltage in response to the summed voltage.

3. The over-current protection circuit of claim 1, wherein the control block comprises one or more signal control paths, each signal control path of the one or more signal control paths comprises:
   a low pass filter configured to generate a filtered voltage in response to an input voltage of the one or more input voltages;
   a threshold addition block configured to add a voltage threshold to the filtered voltage to generate a shifted voltage;
   an additional low pass filter configured to generate an average filtered voltage in response to the average voltage;
   a comparator configured to compare the shifted voltage and the average filtered voltage to generate a detected signal; and
   a digital filter configured to filter the detected signal to generate the control signal.

4. The over-current protection circuit of claim 1, wherein the one or more PWM signals are provided to a PWM controller, the PWM controller configured to drive a load based on the one or more PWM signals, and a number of PWM signals provide a number of phases in the PWM controller, and wherein a voltage generated across the load is the output voltage.

5. The over-current protection circuit of claim 4, wherein the PWM controller comprises:
   a buffer configured to store the one or more PWM signals;
   a driver configured to generate one or more driving signals in response to the one or more PWM signals; and
   one or more switches coupled to the driver, a switch of the one or more switches is activated by the driver in a defined phase of the number of phases in the PWM controller.

6. The over-current protection circuit of claim 5, wherein the load is coupled to the one or more switches, and when a switch is activated by the driver, the switch is configured to provide a current to the load in response to the driving signal of the one or more driving signals.

7. The over-current protection circuit of claim 5, wherein each switch of the one or more switches comprises an inductor, and a voltage across the inductor is a differential voltage of the one or more differential voltages.

8. The over-current protection circuit of claim 5, wherein each switch of the one or more switches comprises:
   a first transistor configured to receive an input supply; and
   a second transistor coupled to the first transistor at a common node, wherein the inductor is coupled between the common node and the load, and a gate terminal of each of the first transistor and the second transistor receives driving signals of the one or more driving signals from the driver.

9. The over-current protection circuit of claim 5, wherein a number of switches is equal to the number of phases in the PWM controller.

10. A method of over-current protection comprising:
    generating one or more input voltages, a summed voltage and an average voltage in response to one or more differential voltages;
    generating one or more control signals in response to the one or more input voltages and the average voltage;
    generating an initiation signal in response to the summed voltage and an output voltage; and
    generating one or more PWM (pulse width modulated) signals in response to the initiation signal and the one or more control signals.

11. The method of claim 10 further comprising:
    generating the one or more input voltages in response to one or more differential voltages;
    summing the one or more input voltages to generate the summed voltage; and
    generating the average voltage from the summed voltage.

12. The method of claim 10, wherein generating a control signal of the one or more control signal further comprises:
    generating a filtered voltage in response to an input voltage of the one or more input voltages;
    adding a voltage threshold to the filtered voltage to generate a shifted voltage;
    generating an average filtered voltage in response to the average voltage;
    comparing the shifted voltage and the average filtered voltage to generate a detected signal; and
    filtering the detected signal.

13. The method of claim 10 further comprising providing the one or more PWM signals to a PWM controller, wherein the PWM controller is configured to drive a load based on the one or more PWM signals, and a number of PWM signals provide a number of phases in the PWM controller, and wherein a voltage generated across the load is the output voltage.

14. The method of claim 13, wherein driving the load by the PWM controller further comprises:
    storing the one or more PWM signals;
    generating one or more driving signals in response to the one or more PWM signals;
    providing the one or more driving signals to one or more switches; and
    activating a switch of the one or more switches, wherein the switch is configured to provide a current to the load in response to a driving signal of the one or more driving signals.

15. The method of claim 14, wherein the switch is activated by a driving signal of the one or more driving signals, and the switch is activated in a defined phase of the number of phases in the PWM controller.

16. The method of claim 14, wherein each switch of the one or more switches comprises an inductor, and a voltage across the inductor is a differential voltage of the one or more differential voltages.

17. The method of claim 14, wherein a number of switches is equal to the number of phases in the PWM controller, and each switch of the one or more switches comprises:
- a first transistor configured to receive an input supply; and
- a second transistor coupled to the first transistor at a common node, wherein the inductor is coupled between the common node and the load, and a gate terminal of each of the first transistor and the second transistor receives driving signals of the one or more driving signals.

18. A computing device comprising:
a processing unit;
a memory module coupled to the processing unit; and
a switching regulator coupled to the processing unit and the memory module, the switching regulator comprising an over-current protection circuit, the over-current protection circuit comprising:
- a signal generating block configured to generate one or more input voltages, a summed voltage and an average voltage in response to one or more differential voltages;
- a control block configured to generate one or more control signals in response to the one or more input voltages and the average voltage;
- an analog control loop block configured to generate an initiation signal in response to the summed voltage and an output voltage; and
- a phase control logic block configured to generate one or more PWM (pulse width modulated) signals in response to the initiation signal and the one or more control signals.

19. The computing device of claim 18, wherein the signal generating block comprises:
- one or more gain circuits configured to generate the one or more input voltages in response to the one or more differential voltages;
- a summer configured to sum the one or more input voltages to generate the summed voltage; and
- an averaging circuit coupled to the summer and configured to generate the average voltage in response to the summed voltage.

20. The computing device of claim 18, wherein the one or more PWM signals are provided to a PWM controller, the PWM controller configured to drive a load based on the one or more PWM signals, and a number of PWM signals provide a number of phases in the PWM controller, and wherein a voltage generated across the load is the output voltage.

* * * * *